Nov. 6, 1951     D. H. WEINSTEIN ET AL     2,573,748
ACOUSTIC RANGING SYSTEM, INCLUDING MAGNETIC RECORDING

Filed Jan. 25, 1944     2 SHEETS—SHEET 1

*INVENTOR.*
DAVID H. WEINSTEIN
MORRIS KEISER
BY
William D. Hall.
Attorney

Nov. 6, 1951   D. H. WEINSTEIN ET AL   2,573,748
ACOUSTIC RANGING SYSTEM, INCLUDING MAGNETIC RECORDING
Filed Jan. 25, 1944   2 SHEETS—SHEET 2

INVENTOR.
DAVID H. WEINSTEIN
MORRIS KEISER
BY
William D Hall
Attorney

Patented Nov. 6, 1951

2,573,748

UNITED STATES PATENT OFFICE 2,573,748

ACOUSTIC RANGING SYSTEM, INCLUDING MAGNETIC RECORDING

David H. Weinstein, Pasadena, Calif., and Morris Keiser, Long Branch, N. J., assignors to the United States of America as represented by the Secretary of War Application January 25, 1944, Serial No. 519,638

4 Claims. (Cl. 181—0.5)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a method of, and apparatus for electrically recording and optically viewing sonic waves, more especially it is directed to the use of such apparatus in determining the position of a source of sound.

A known method of ascertaining the disposition of a source of sound, such as a hostile artillery emplacement, is to station a plurality of microphones in the field at trigonometrically determined points and to connect these microphones by means of trunk lines or radio communication with one or more recording devices situated in the rear for recording the received sound impulses. On the basis of the time intervals with which the sound waves arrive at the microphones, and from the velocity of the sound waves, the location of the gun can be determined.

Apparatus of this character has military value only if the sound recording and the calculation of the result can be rapidly and accurately effected. If the measuring technique is slow, the hostile guns can change their position before information as to their whereabouts can be transmitted to the artillery.

Apparatus heretofore employed for this purpose have been provided with moving coil or string oscillographs which record the sound wave, that is to say, the electrical currents induced thereby, on sensitive paper or a film strip. The oscillographs are energized by amplifier channels which receive and amplify the impulses from the various field microphones.

Where a moving film is employed the record must first be developed, fixed, and washed before it is accessible for observation. Field procedure is complicated by the fact that developing and fixing chemicals must be prepared at each recording station, that the temperature of the solutions be kept within a relatively narrow range of limits, whereas external temperature varies widely, and finally that a skilled operator must be employed to compose the chemicals. Accordingly, these recorders very often fail in consequence of their slow availability. Moreover, the oscillographs, as well as the water tight and light proof developing magazines for the recordings, require careful transport which is seldom possible under military field conditions.

Because of the need for chemical containers, electric heaters, large wattage recording lamps as well as associated power supply units, apparatus heretofore used has been of considerable size and weight, factors which constitute, for military purposes, a serious drawback. In addition, the film, being of an expendable nature, necessitates the inclusion of a reserve film reel supply with the measuring apparatus when operation is intended for prolonged periods. This requirement further contributes to the undesirable weight.

Therefore, the object of the present invention is to provide a sound measuring arrangement which is of simple, compact and of efficient construction and which will operate quickly and accurately.

An additional object of this invention is to provide a measuring arrangement for sound ranging which requires no expendable materials.

A further object of this invention is to provide a sound measuring arrangement in which the sound is magnetically recorded and reproduced.

A still further object of this invention is to provide optical viewing means for a sound wave not entailing photographic equipment and in which a mirror oscillograph is utilized.

Another object of this invention is to provide a sound ranging system employing a plurality of microphones in which but a single amplifier channel is required in conjunction with the measuring device.

Yet another object of this invention is to provide a magnetic sound system which is effectively responsive to audio-frequencies within the zero to 50 cycle range and which has a recording time reservoir in the order 15 to 30 seconds.

These and other objects and features will become apparent in the ensuing description.

In carrying out our invention we employ a magnetic recording system comprising a drum having affixed thereon a plurality of continuous paramagnetic tapes or bands. Associated with the tapes are a like plurality of magnetic recording heads which are actuated by the field microphones. The drum is slowly rotated so that although the circumference of the tape is relatively small, the length of available recording time is more than adequate for sound ranging purposes.

In reproducing or playing back the recorded sounds, magnetic pick-ups are used in conjunction with the tapes and the drum is continuously revolved at a greatly increased speed. Inasmuch as low frequencies predominate in the frequency spectrum of gun sounds, and the electrical response of the magnetic pick-ups is proportional to the frequency of the recordings, the increased play-back drum speed, in effect raises the frequency of the recorded sound and in consequence the pick-up response. The various pick-ups are angularly displaced from each other around the circumference of the drum in a manner where by means of a commutator switch arrangement in connection with the pick-ups, corresponding segments of the tapes are consecutively connected to a mirror oscillograph. The oscillograph comprises a mirror type D'Arsonval galvanometer and a revolving multi-faced scanning mirror having a magnifying eye piece trained thereon for direct viewing. As the electrical impulses from each tape segment are impressed upon the oscillograph, a bias voltage is simultaneously imposed which serves to determine the zero position of the image as seen in the eyepiece. The bias voltage is made progressively larger for each segment so that each segment pattern assumes a distinct, spaced position. Although the image of each segment appears in regular sequence before the eyepiece lens, because of the rate of switching and the phenomenon of visual persistence, the images are seen simultaneously and without perceptible flicker. Accordingly, in viewing the wave forms in the eyepiece, the wave forms of the corresponding segments are seen along parallel positions and by the use of a super-imposed calibrated scale the intervals between wave trains may be viewed and the disposition of the detonation source calculated. By shifting the position of the magnetic pick-ups in respect to their associated tapes any desired segment of the recording may be observed. Magnetic eraser heads are incorporated in the recording device which permit the constant reuse of a single drum record and obviate the need for a reserve supply.

A more comprehensive understanding of this invention may be obtained from the following detailed description when taken together with the accompanying drawing in which.

Figure 1:
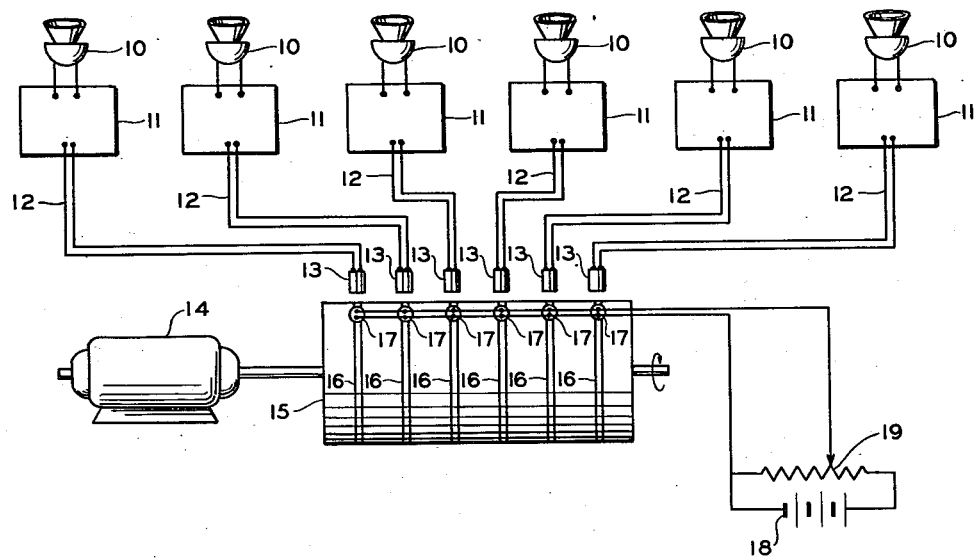
Figure 1 is a schematic diagram of a recording device used in our invention.

Referring now to the drawing and more particularly to Figure 1, a set of 6 omni-directional microphones 10 are provided which are disposed at trigonometrically determined points in the field in the manner customary in sound ranging. Sound wave trains emanating from a site of detonation are received by the microphones at a time and in a sequence determined by their positions in respect to the sound source and the velocity of the sound wave.

The electrical impulses derived from the microphones are amplified by the amplifiers 11 to an intensity level prescribed by the length of the trunk lines 12 and the voltage requirements of the magnetic recorders. The amplifiers 11 and microphones 10 as well as the requisite power batteries may be contained in unitary assemblies in the field. The lines 12 from the amplifiers 11 extend and converge at the ranging equipment and are terminated in magnetic recording heads 13 which take the form of small electromagnets.

A motor 14 is provided which in operation makes a complete revolution in approximately 30 seconds. Removably coupled to the motor 14 is a hollow drum 15 which may be dimensioned as small as 6 inches in diameter, preferably composed of soft iron or a metal having similar magnetic properties i. e., of high permeability but of a non-retentive magnetic character. By means of a clutch mechanism (not shown) the drum is permitted to complete one revolution and is then stopped.

Encircling the drum 15 and fixedly secured thereto at equally spaced positions along the circumference thereof are 6 continuous paramagnetic tapes 16 of the type used for magnetic sound recording. In close proximity with the tapes 16 and similarly spaced with respect to the drum in a radial plane therewith are mounted a set of 6 magnetic recording heads 13. The heads 13 when energized by the electrical output of the microphone amplifiers 11 serve to magnetize by induction the moving paramagnetic tapes. The degree and polarity of the magnetization corresponds to the amplitude and frequency of the sound waves. The resultant magnetic pattern impressed on the tape is permanently retained therein unless altered or erased by further magnetic induction. The drum being of soft iron offers high permeability to the lines of force radiating from the head thus concentrating the magnetic field in the drum area. However, the soft iron being magnetically non-retentive is not permanently affected by the recording currents.

In juxtaposition to the recording heads 13 are a set of 6 eraser heads 17 which are provided for the purpose of blanking out used records thereby permitting a new recording of sound without the insertion of a new drum. The drum revolves in a clockwise direction thereby allowing the eraser heads to first act upon the tape and remove old impressions before the tape reaches the recording heads. The eraser heads are electromagnets in parallel connection and are energized by a battery 18 having a potentiometer 19 shunted thereon for controlling the voltage applied to the erasers.

Figure 2:
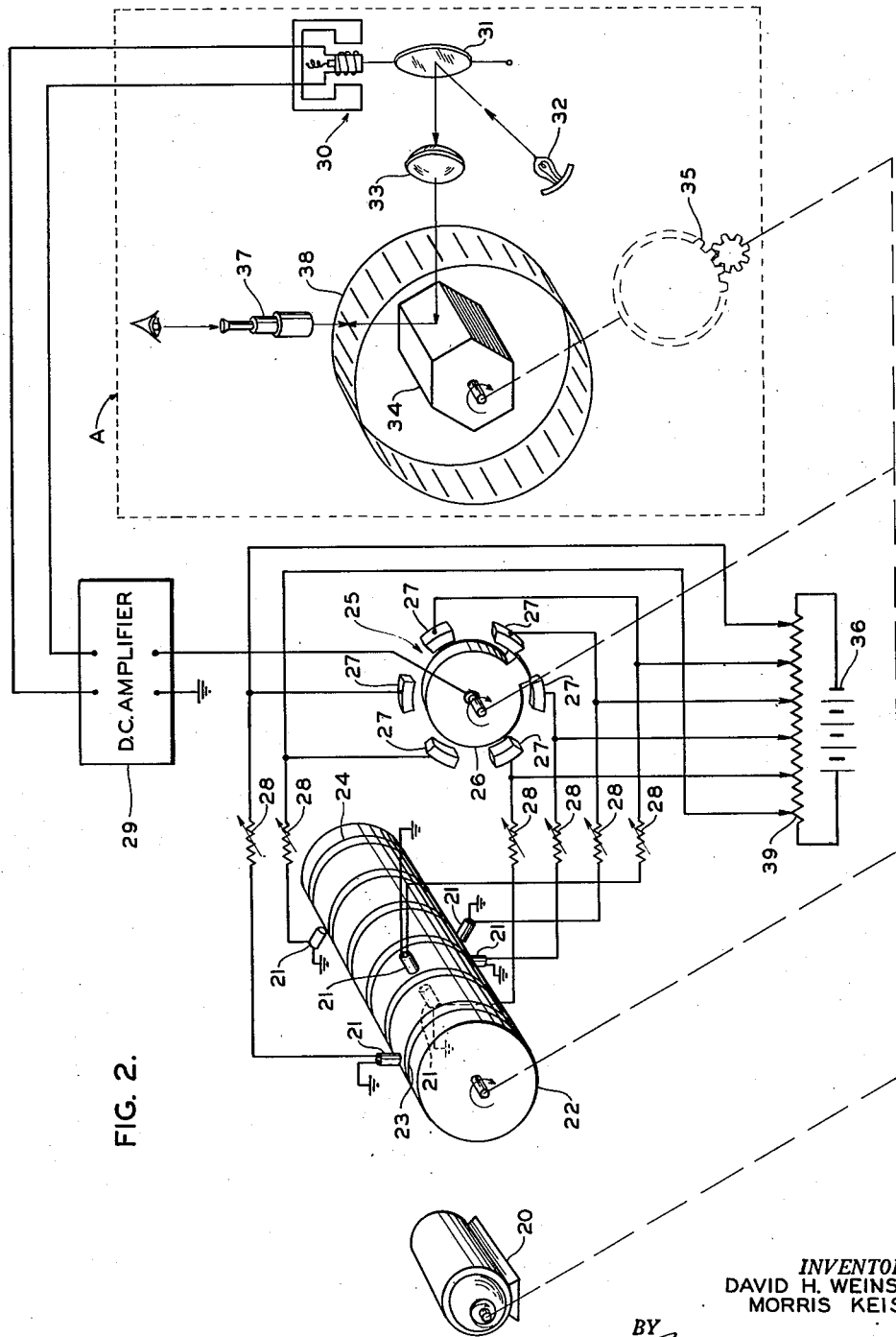
Figure 2 is a schematic diagram partially in perspective of a reproducer device and a mirror oscillograph used in our invention.

When the record is completed the drum is removed from the shaft of the recording motor 14 and is coupled to the shaft of a playback motor 20. This is illustrated in Figure 2 which for purposes of clarity, indicates the shaft connections by means of broken lines signifying that the various devices associated by the lines are in some manner ganged with the motor shaft and revolve in synchronism therewith. The speed of the motor is in the order of 20 revolutions per second.

Each tape on the drum 22 has disposed adjacent thereto a magnetic pick-up head 21. The pick-ups are disposed at points 60 degrees from each other around the circumference of the drum. Since there are 6 picks-ups and the circumference has 360 degrees it may obviously be seen that the first tape 23 has its pick-up head at zero degrees and the last 24, has its pick-up at 300 degrees thus evenly spacing the pick-ups.

Also mechanically coupled to the shaft is a commutator switch 25 having a rotor cam 26 and a stator comprising 6 arcuate contacts 27 radially positioned at points 60 degrees from each other. Each of the contacts is wired through a variable resistor 28 to a correspondingly disposed pick-up head 21. As the cam 26 rotates an electrical connection is effected between each of the contacts 27 in sequence for a period of time necessary for the cam to transverse a 60 degree arc. The commutator acts as a switch between the pick-up heads 21 and a direct-coupled amplifier 29 of conventional design, which is responsive to direct current as well as audio currents.

It may be seen that as the commutator revolves, a set of 6 tape segments each covering a 60 degree arc, and occupying identical angular positions on the drum is sequentially switched into the amplifier 29.

For the purpose of optically viewing the sound waves a mirror type oscillograph A is employed comprising a mirror galvanometer 30, a scanning mirror 34, a viewing eyepiece 37 and a scale 38. The electrical output of the amplifier 29 is fed to the mirror type D'Arsonval galvanometer 30 which when actuated by the electrical wave trains causes an oval mirror 31 to mechanically oscillate in a manner corresponding to the amplitude and frequency of the input waves. The galvanometer 30 is arranged so that the wave currents mechanically modulate the mirror in a plane normal to the face thereof.

The rays emitted from a light source 32 comprising a small electric bulb and parabolic reflector are directed onto the galvanometer mirror 31 and the resultant reflections are converged and focused by convex lens 33. The focal point of the lens 33 lies somewhat beyond the hexagonal mirror 34 but due to reflection it is brought to a point in space in the plane of scale 38. The scale 38, being of transparent material does not impede the passage of light to the scanning mirror 34 from source 32 and mirror 31. The hexagonal mirror 34 is also coupled to the motor 20 by means of a 1 to 4 ratio reduction gear mechanism 35.

The initial orientation of the galvanometer mirror 31 as well as the point of focus in space is governed by a bias voltage furnished by battery 36. Shunted across the battery 36 is a multiple tap potentiometer 39 with the taps thereof wired to the contacts 27 of the commutator switch 25. Assuming the absence of an electrical sound wave input in the amplifier 29 the only voltages applied to the galvanometer 30 through the amplifier 29 will be the biasing voltages. The taps are arranged so that as the commutator switch 25 makes a complete rotation, the voltages applied are arithmetically progressive in value. Consequently the galvanometer mirror 31 will be displaced to 6 distinct equi-spaced positions. Likewise the reflected light from the galvanometer mirror 31 will be focused in sequence to 6 distinct points in space in the plane of the scale 38.

When the audio currents from the pick-ups 21 are superimposed over the bias voltage, the waves being alternating in character add to or detract from the bias voltages. The waves from the pick-ups 21 vary about distinctly spaced base lines. The variable resistors 28 are adjusted so that the audio currents generated in their associated pick-ups never achieve an intensity output sufficient to deflect the light beam off the measurement area of the scale 38.

The combination of the mirror galvanometer 30 and the scanning mirror 34 performs as a mirror oscillograph in a well-known manner. The vertical deflection is obtained by the mirror galvanometer 30 which vertically reciprocates the light beam on the scanning mirror and in space as a function of the wave currents. The horizontal deflection is obtained by the scanning mirror 34, which, being coupled to the motor, concurrently sweeps out the beam horizontally, thus creating a visual wave pattern corresponding to the electrical wave input of the oscillogram A, Fig. 3. Each unit mirror of the hexagonal mirror 34 receives in discrete positions the complete signals of 4 of the set of 6 corresponding 60 degree segments of the tapes and as the angle of the mirror presented to the incident beam is varied by rotation, it sweeps out the beam in a 15 degree arc.

The gear reduction being of a 1 to 4 ratio results in the mirror moving 15 degrees as the drum travels 60 degrees. The reason for reducing the sweep of the image is to permit the eyepiece 37 to view the wave pattern of an entire segment of the tape. If the scanning mirror 34 were directly geared to the motor the full image would be expanded far beyond the scope of the eyepiece lens. The ratio of reduction gearing may be further increased an integral number of times, if it is desired to further compress the visual range.

The light wave is imposed upon a calibrated scale 38 of transparent material having indicia etched thereon in terms of time. The scale 38 is mounted coaxially with the scanning mirror 34.

Figure 3:
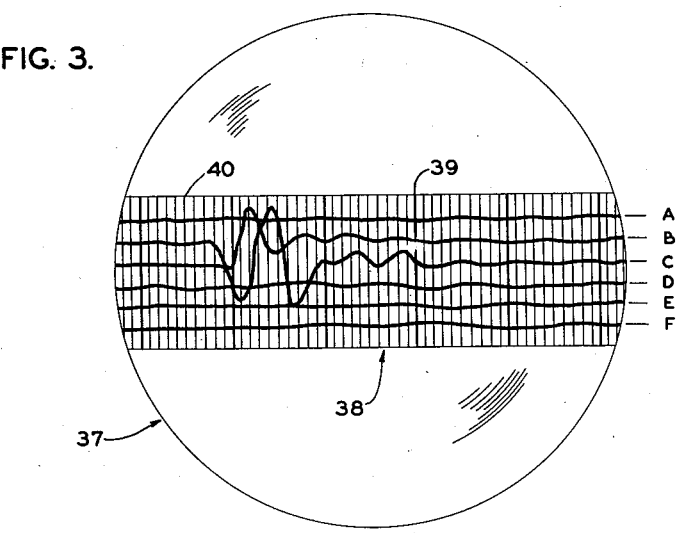
Figure 3 illustrates the optical image of the recorded wave forms as viewed in the eyepiece associated with the mirror oscillograph.

As the wave images on the scale 38 are viewed through the magnifying eyepiece 37 the 6 wave forms appear to be juxtaposed in the manner shown in Figure 3. The wave traces A—F represent the forms of the wave trains as received by the microphones during the period recorded by the corresponding segments of the tapes under observation. Although the waves are projected on the scale individually and in rapid sequence, they are seen simultaneously because of visual persistence. The heavy indicia 39 represent seconds and the light indicia 40 fractions thereof. In the example illustrated in Figure 3 it may be seen that traces B and C have large humps thereon, indicating the reception of sound pulses in their respective microphone channels at spaced intervals.

The pick-up heads 21 in Figure 2 are mounted on a cylindrical supporting member (not shown) concentric with the drum, having adjustment means for axial movement thereof. In order to observe another corresponding group of segments, the pick-ups are shifted by the support to any desired position around the tapes. The cylindrical support is mechanically coupled to the scale 38 in a manner where by manually shifting the scale 38 to any angular position, the support is similarly shifted.

The full time range of the scale 38 is equal to the recording reservoir of the record which in the embodiment under discussion, is 30 seconds. The segments, therefore, represent 5 seconds of time and to view the entire record the scale must be shifted 6 times.

The use of an eyepiece 37 is preferred to the conventional translucent screen employed in conjunction with mirror oscillographs since it allows the use of a relatively small light source to secure an image of good clarity and fine definition. The invention however is operable and may be used with conventional mirror oscillograph devices.

The invention need not only be used with 6 microphone channels, but may be adapted to meet any channel requirement. However, if more or fewer channels are used the number of tapes, recording heads, commutators, segments, etc., are similarly augmented or reduced. In such instances the pick-ups are angularly spaced around the drum at points equal to 360 degrees divided by the number of pick-ups used.

Since the play back motor speed is not critical but may be varied within a wide tolerance without seriously affecting the electrical response of the pick-ups 21 or causing visual flicker of the images, the motor may be replaced by a manual crank mechanism if a further reduction in equipment weight is desired.

Although we have described our invention as applied to sound ranging measurements it may readily be adapted to operate as an electrocardiograph, for geophysical exploration or for water depth sounding and related measurements entailing the observation and comparison of wave motions. It is merely necessary to substitute for the microphones 10 described in connection with Figure 1, seismometers or whatever receiving device is called for by the wave motion under study.

It is, therefore, to be understood that we do not limit ourselves to the exact details of construction and arrangements shown, but may employ such changes and modifications as come within the meaning as set forth in the appended claims.

We claim:

1. A system for determining the position of a source of sound waves including a plurality of sound receivers disposed at trigonometrically determined points remote from said source, a corresponding plurality of magnetic recorders connected to said receivers, a corresponding plurality of endless magnetic tapes in recording relationship with respect to said recorders for producing a corresponding plurality of magnetic records of said sound waves on said tapes, a screen, means for reproducing on said screen said magnetic records as visible patterns of said sound waves, means for sequentially selecting equal portions of said magnetic records corresponding in time, means for sequentially and repeatedly connecting said selecting means to said reproducing means at a rate providing visual persistence for simultaneous simulation of said visible patterns on said screen, means for laterally displacing the base lines of said patterns on said screen, a calibrated time scale on said screen, means for shifting in unison the portions of said magnetic records selected by said selecting means, and means for shifting said scale together with said last mentioned shifting means.

2. In a system for determining the source of sound waves, wherein a plurality of magnetic recordings on endless tapes are obtained during a predetermined time interval from a like plurality of sound receivers disposed at trigonometrically determined points remote from said source, the apparatus for visually reproducing said plurality of recorded waves comprising an oscillograph means having a screen for displaying recorded waves, a corresponding plurality of reproducer heads equi-spaced about the circumferences of said endless tapes and each of which is disposed adjacent to a respective tape, a commutator coupled to said oscillograph means and having a like plurality of segments connected to said reproducer heads to sequentially apply the voltage developed by each of said reproducer heads to said oscillograph means, means to revolve said endless tapes and to operate said commutator in synchronism at a rate providing visually persistent images on the screen of said oscillograph means, means for laterally displacing with respect to each other the positions taken by the base lines of the images of the wave forms of said plurality of magnetic recordings, and means for shifting in unison the positions of said reproducer heads about the circumferences of said tapes whereby desired corresponding portions of said tapes may be simultaneously viewed on said screen.

3. A system for determining the position of a source of sound waves comprising a plurality of sound receivers disposed at trigonometrically determined points remote from said source; a sound recorder comprising a corresponding plurality of endless magnetic tapes disposed in spaced relationship, a corresponding plurality of recording heads disposed adjacent to said tapes for impressing magnetic patterns on each tape, each of said recording heads being connected to a respective one of said sound receivers, means for revolving said plurality of endless tapes in synchronism at a given low speed, means for arresting said rotation upon the completion of one revolution of said endless tape; and reproducer means comprising an oscillograph means having a screen for displaying modulated waves, a like plurality of reproducer heads having mutually different angular positions about the circumferences of said endless tapes and each of which is adjacent to a respective tape, a commutator having a like plurality of segments connected to sequentially apply to said oscillograph means voltages developed by each of said reproducer heads, means for revolving said endless tapes and said commutator at a rate which is high relative to said given low speed for providing visually persistent images on said screen, and means for shifting in unison the positions of said reproducer heads about the circumferences of said endless tapes.

4. In a system for determining the position of a source of sound waves comprising a plurality of sound receivers disposed at trigonometrically determined points remote from said source, a sound recorder and reproducer comprising a drum, a plurality of paramagnetic tapes encircling said drum disposed in spaced relation thereon, a corresponding plurality of recorder heads respectively connected with said sound receivers and disposed adjacent to said tapes along a line parallel to the axis of said drum, a corresponding plurality of erasure heads disposed adjacent to said recorder heads along a line parallel to the axis of said drum, means for energizing said erasure heads with a direct current, means for rotating said drum about its axis, means for arresting said rotation upon completion of one revolution, a corresponding plurality of reproducer heads arranged for alignment with said tapes, said reproducer heads being spaced about the circumference of a cylinder and defining a helix, means for rotating said drum with said tapes adjacent said reproducer heads, means for producing visible wave images corresponding with magnetic patterns impressed on said tapes by said recorder heads, commutator means for coupling each of said reproducer heads to said image producing means in sequence and at a rate providing persistence of vision, whereby corresponding portions of the impressions on said tapes are reproduced consecutively, means for viewing said images simultaneously, means for laterally displacing the base lines of said wave images, means for varying in unison the portions of said impressions on said tapes which are reproduced, a scale superimposed upon said images, and means for shifting said scale in accordance with the variation of said portions reproduced.

DAVID H. WEINSTEIN.
MORRIS KEISER.

REFERENCES CITED

The following references are of record in the file of this patent:

UNITED STATES PATENTS

| Number | Name | Date |
|---|---|---|
| 2,062,174 | Haskins et al. | Nov. 24, 1936 |
| 2,183,934 | Heiland | Dec. 9, 1939 |
| 2,267,356 | Ritzman | Dec. 23, 1941 |
| 2,366,043 | Mounce | Dec. 26, 1944 |
| 2,370,385 | Abraham et al. | Feb. 27, 1945 |
| 2,378,383 | Arndt | June 19, 1945 |
| 2,380,392 | Begun | July 31, 1945 |
| 2,418,136 | Munson et al. | Apr. 1, 1947 |
| 2,424,633 | Rieber | July 29, 1947 |
| 2,426,838 | Miller | Sept. 2, 1947 |

FOREIGN PATENTS

| Number | Country | Date |
|---|---|---|
| 275,783 | Germany | Apr. 11, 1912 |
| 518,352 | Germany | Feb. 9, 1929 |
| 537,322 | Germany | Apr. 3, 1930 |
| 472,417 | Great Britain | Apr. 9, 1936 |